US 7,590,045 B2

(12) United States Patent
Oh et al.

(10) Patent No.: US 7,590,045 B2
(45) Date of Patent: Sep. 15, 2009

(54) APPARATUS AND METHOD FOR TRANSMITTING FAST FEEDBACK INFORMATION IN A WIRELESS COMMUNICATION SYSTEM

(75) Inventors: Jeong-Tae Oh, Yongin-si (KR); Won-Il Roh, Yongin-si (KR); Kyun-Byoung Ko, Hwaseong-si (KR); Jae-Ho Jeon, Seongnam-si (KR); Seung-Joo Maeng, Seongnam-si (KR); Chan-Byoung Chae, Seoul (KR); Hong-Sil Jeong, Suwon-si (KR); Sung-Ryul Yun, Suwon-si (KR); Myung-Kwang Byun, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 611 days.

(21) Appl. No.: 11/329,615

(22) Filed: Jan. 11, 2006

(65) Prior Publication Data

US 2006/0176803 A1    Aug. 10, 2006

(30) Foreign Application Priority Data

Jan. 11, 2005    (KR) .................... 10-2005-0002700
Jun. 4, 2005     (KR) .................... 10-2005-0048138

(51) Int. Cl.
*H04J 11/00*    (2006.01)
(52) U.S. Cl. .................. 370/210; 370/208; 370/209; 375/259
(58) Field of Classification Search ............. 370/496, 370/522, 458, 208–210; 375/259
See application file for complete search history.

(56) References Cited

U.S. PATENT DOCUMENTS

| 7,142,502 | B2 * | 11/2006 | Jacobsen ................. 370/208 |
| 7,298,787 | B2 * | 11/2007 | Priotti ..................... 375/267 |
| 2002/0126740 | A1 * | 9/2002 | Giannakis et al. ......... 375/143 |
| 2002/0136327 | A1 * | 9/2002 | El-Gamal et al. ......... 375/308 |
| 2002/0146078 | A1 * | 10/2002 | Gorokhov et al. ......... 375/260 |
| 2003/0169824 | A1 * | 9/2003 | Chayat ..................... 375/260 |
| 2004/0037214 | A1 * | 2/2004 | Blasco Claret et al. .... 370/203 |
| 2005/0058217 | A1 * | 3/2005 | Sandhu et al. ............. 375/267 |
| 2005/0063378 | A1 * | 3/2005 | Kadous ..................... 370/389 |

FOREIGN PATENT DOCUMENTS

| CN | 1450822 | 10/2003 |
| CN | 1547339 | 11/2004 |
| JP | 2000-232432 | 8/2000 |
| JP | 2001-512914 | 8/2001 |
| JP | 2003-273775 | 9/2003 |

(Continued)

*Primary Examiner*—Charles N Appiah
*Assistant Examiner*—Kwasi Karikari
(74) *Attorney, Agent, or Firm*—The Farrell Law Firm, LLP

(57) ABSTRACT

An apparatus is provided for transmitting uplink fast feedback information in a wireless communication system. In the apparatus, a channel encoder generates uplink fast feedback information to transmit, and outputs 3-bit codewords being set according to the fast feedback information. A noncoherent modulator modulates transmission symbols corresponding to the codewords using a noncoherent modulation scheme, and allocates the modulated transmission symbols to each of subcarrier bundles. An inverse fast Fourier transform (IFFT) unit IFFT-processes a transmission signal comprised of the subcarrier bundles before transmission.

12 Claims, 3 Drawing Sheets

FOREIGN PATENT DOCUMENTS

| | | |
|---|---|---|
| JP | 2004-502328 | 1/2004 |
| JP | 2004-129082 | 4/2004 |
| JP | 2004-194262 | 7/2004 |
| JP | 2004-523934 | 8/2004 |
| JP | 2004-343702 | 12/2004 |
| JP | 2004-537875 | 12/2004 |
| JP | 2005-027107 | 1/2005 |
| JP | 2005-073259 | 3/2005 |
| WO | WO 99/07076 | 2/1999 |
| WO | WO 02/01761 | 1/2002 |
| WO | WO 02/31991 | 4/2002 |
| WO | WO 02/49306 | 6/2002 |

* cited by examiner

US 7,590,045 B2

APPARATUS AND METHOD FOR TRANSMITTING FAST FEEDBACK INFORMATION IN A WIRELESS COMMUNICATION SYSTEM

PRIORITY

This application claims the benefit under 35 U.S.C. § 119(a) of an application entitled "Apparatus and Method for Transmitting Fast Feedback Information in a Wireless Communication System" filed in the Korean Intellectual Property Office on Jan. 11, 2005 and assigned Serial No. 2005-2700 and an application entitled "Apparatus and Method for Transmitting Fast Feedback Information in a Wireless Communication System" filed in the Korean Intellectual Property Office on Jun. 4, 2005 and assigned Serial No. 2005-48138, the entire contents of both of which are incorporated herein by reference.

BACKGROUND OF THE INVENTION

1. Field of the Invention

The present invention relates generally to an apparatus and method for transmitting control information in a wireless communication system, and in particular, to an apparatus and method for transmitting fast feedback information in a Broadband Wireless Access (BWA) communication system.

2. Description of the Related Art

A mobile communication system is a typical wireless communication system. The mobile communication system is gradually evolving into a system capable of providing wireless packet data service based on voice service. The $3^{rd}$ Generation (3G) mobile communication system that can provide wireless packet data service is developing into a system capable of providing various multimedia services at a high rate. The 3G mobile communication system identifies users using a Code Division Multiple Access (CDMA) scheme. The CDMA scheme can transmit data by allocating different orthogonal codes or transmission data to users.

However, the 3G system cannot provide data at a higher rate with higher quality due to a lack of codes. That is, the 3G system is limited in data rate due to a restriction of available codes. In order to address this problem, mobile communication system developers are taking into consideration a $4^{th}$ Generation (4G) BWA communication system, referred to as the next generation communication system. The 4G system can classify users or user data using an Orthogonal Frequency Division Multiple Access (OFDMA) scheme before transmission. The 4G system can increase data rate up to about 100 Mbps. Therefore, compared with the 3G system, the 4G system can provide services with various Qualities-of-Service (QoS).

Research on the 4G system now focuses on the BWA communication system such as a wireless Local Area Network (LAN) system and a wireless Metropolitan Area Network (MAN) system. The BWA communication system is evolving into a system capable of guaranteeing QoS, providing mobility which is the characteristic of a wireless communication system. An Institute of Electrical and Electronics Engineers (IEEE) 802.16a communication system and an IEEE 802.16e communication system are typical BWA communication systems. In addition, various other systems are being developed using the OFDMA scheme.

The BWA communication system is developing into a system that basically uses the OFDMA scheme and can guarantee mobility. For data transmission, the BWA communication system transmits Orthogonal Frequency Division Multiplexing (OFDM) symbols basically using a Time Division Duplexing (TDD) scheme. In transmitting OFDM symbols, the BWA communication system divides the OFDM symbols into a downlink and an uplink in a period of a particular time domain because it uses the TDD scheme. Each of the downlink and the uplink transmits OFDM symbols in particular slots. Such a BWA communication system can distinguish the OFDM symbols as physical channels having a separate particular purpose in the uplink and the downlink.

The OFDMA-based communication system has physical channels for fast feedback in the uplink. Information included in the physical channels for fast feedback includes perfect signal-to-noise ratio (SNR) information, per-band differential SNR information, fast Multi-Input Multi-Output (MIMO) feedback information, mode selection feedback information, MIMO feedback information, etc. The perfect SNR information refers to an SNR for a full band. Such fast feedback information for the uplink requires a guarantee of high reliability because it is very important for application of a communication system although it is large in quantity.

In transmitting the fast feedback information in the uplink, the conventional technology transmits 6-bit information using one uplink subchannel. However, transmitting only the fixed 6-bit information using one uplink subchannel causes a lack of application flexibility for a system requiring various feedback information, for example, for a MIMO system that has multiple antennas and requires feedback information for each individual antenna or stream. This is because the multi-antenna transmission system requires information on various wireless channels in order to acquire optimal performance while using a plurality of transmission antennas.

Therefore, the multi-antenna transmission system requires diverse feedback information according to a multi-antenna transmission algorithm. However, presently there is no proposed scheme for a method capable of providing the diverse information.

SUMMARY OF THE INVENTION

It is, therefore, an object of the present invention to provide an apparatus and method for transmitting diverse fast feedback information on an uplink in a wireless communication system.

It is another object of the present invention to provide an apparatus and method for transmitting more fast feedback information in a wireless communication system.

It is further another object of the present invention to provide an apparatus and method for performing efficient communication through diverse fast feedback information from an uplink in a wireless communication system.

It is yet another object of the present invention to provide an apparatus and method for correctly delivering feedback information on an uplink in a BWA communication system.

It is still another object of the present invention to provide an apparatus and method for securing flexibility of feedback information delivered on an uplink in a BWA communication system.

According to one aspect of the present invention, there is provided an apparatus for transmitting uplink fast feedback information in a wireless communication system. The apparatus includes a channel encoder for generating uplink fast feedback information to transmit, and outputting 3-bit codewords being set such that a minimum Hamming distance defined in a system setup process becomes maximized according to the fast feedback information; a noncoherent modulator for modulating transmission symbols corresponding to the codewords using a noncoherent modulation scheme, and allocating the modulated transmission symbols to each of subcarrier bundles; and an inverse fast Fourier transform (IFFT) unit for IFFT-processing a transmission signal comprised of the subcarrier bundles before transmission.

According to another aspect of the present invention, there is provided an apparatus for receiving uplink fast feedback information in a wireless communication system. The apparatus includes a reception device for receiving fast feedback information transmitted from a transmission apparatus through an uplink fast feedback channel, extracting 3-bit fast feedback information or 6-bit fast feedback information from the fast feedback information received from the transmission apparatus, and using the extracted fast feedback information in transmitting information at a next time.

According to further another aspect of the present invention, there is provided an apparatus for transmitting uplink fast feedback information in a wireless communication system. The apparatus includes an encoder for generating an uplink fast feedback information bit stream to transmit, and encoding the fast feedback information bit steam using a coding scheme predefined in a system setup process. The fast feedback information bit stream includes at least one fast feedback information comprised of a predetermined number of bits according to a system condition.

According to yet another aspect of the present invention, there is provided a method for transmitting uplink fast feedback information in a wireless communication system. The method includes: generating uplink fast feedback information to transmit, and outputting 3-bit codewords being set such that a minimum Hamming distance defined in a system setup process becomes maximized according to the fast feedback information; modulating transmission symbols corresponding to the codewords using a noncoherent modulation scheme, and allocating the modulated transmission symbols to each of subcarrier bundles; and performing an inverse fast Fourier transform (IFFT) process on a transmission signal comprised of the subcarrier bundles before transmission.

According to still another aspect of the present invention, there is provided a method for receiving uplink fast feedback information in a wireless communication system. The method includes: receiving fast feedback information transmitted from a transmission apparatus through an uplink fast feedback channel; extracting 3-bit fast feedback information or 6-bit fast feedback information from the fast feedback information received from the transmission apparatus; and controlling information transmission at a next time using the extracted fast feedback information.

According to still another aspect of the present invention, there is provided a method for transmitting uplink fast feedback information in a wireless communication system. The method includes: generating an uplink fast feedback information bit stream to transmit; and encoding the fast feedback information bit steam using a coding scheme predefined in a system setup process. The fast feedback information bit stream includes at least one fast feedback information comprised of a predetermined number of bits according to a system condition.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

Figure 1:
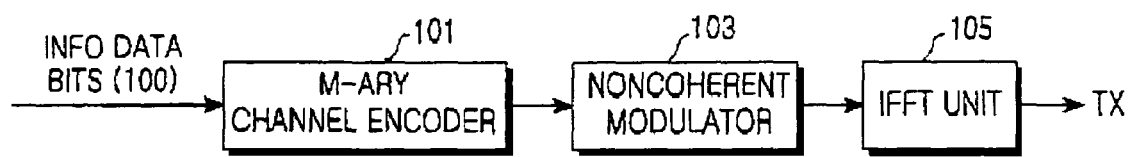
FIG. 1 is a diagram schematically illustrating a structure of a transmitter for transmitting fast feedback information in an OFDMA communication system according to an embodiment of the present invention.

FIG. 1 is a diagram schematically illustrating a structure of a transmitter for transmitting fast feedback information in an OFDMA communication system according to the present invention. In particular, FIG. 1 schematically illustrates partial blocks of a mobile terminal (MS) transmitter for transmitting fast feedback information on an uplink according to the present invention.

Referring to FIG. 1, the transmitter includes an M-ary channel encoder 101 for encoding information data bits 100 of uplink fast feedback information, a noncoherent modulator 103 for modulating the information data bits using a noncoherent scheme, and an Inverse Fast Fourier Transform (IFFT) unit 105 for IFFT-processing a transmission signal before transmission.

As illustrated in FIG. 1, the information data bits 100 represent fast feedback information. The fast feedback information includes information data bits output from a controller (not shown in FIG. 1). A detailed description of the fast feedback information will be given below. The fast feedback information is input to the M-ary channel encoder 101.

If there are information data bits 100 to transmit, the M-ary channel encoder 101 encodes the information data bits 100 into a codeword corresponding thereto, and outputs the codeword to the noncoherent modulator 103. The M-ary channel encoder 101 can be implemented with a binary channel encoder or an M-ary block encoder according to input bits.

The noncoherent modulator 103 receives the codeword output from the M-ary channel encoder 101, modulates transmission symbols corresponding thereto using a noncoherent modulation scheme, and outputs the modulated symbols to the IFFT unit 105. Herein, the noncoherent modulator 103 can use a predetermined modulation scheme, for example, orthogonal modulation.

The IFFT unit 105 IFFT-processes the modulation symbols received from the noncoherent modulator 103, generating OFDM transmission symbols. Although the OFDM symbol generally includes a cyclic prefix (CP), a structure thereof and a structure for transmission in a wireless band are omitted in FIG. 1, for simplicity.

Figure 2:
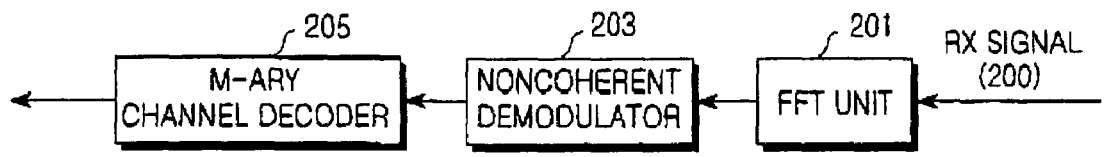
FIG. 2 is a diagram schematically illustrating a structure of a receiver for receiving fast feedback information in an OFDMA communication system according to an embodiment of the present invention.

FIG. 2 is a diagram schematically illustrating a structure of a receiver for receiving fast feedback information in an OFDMA communication system according to the present invention. In particular, FIG. 2 schematically illustrates a structure of a base station (BS) receiver for receiving uplink fast feedback information according to the present invention.

Referring to FIG. 2, the receiver includes a Fast Fourier Transform (FFT) unit 201 for FFT-processing a time-domain reception signal 200 into a frequency-domain reception signal, a noncoherent demodulator 203 for demodulating the frequency-domain reception signal, and an M-ary channel decoder 205 for decoding the demodulated reception symbols into information data bits of fast feedback information.

A process of processing a signal received through a wireless channel and removing a CP from the received signal is omitted in FIG. 2, for simplicity. Therefore, the reception signal 200 corresponds to a signal that underwent signal processing and CP removing process. The reception signal 200 is input to the FFT unit 201.

The FFT unit 201 converts the reception signal 200 received from the transmitter into a time-domain reception signal by performing an FFT process thereon, and outputs the time-domain reception signal to the noncoherent demodulator 203.

The noncoherent demodulator 203 noncoherently demodulates the reception symbols received from the FFT unit 201 by acquiring a soft decision value for the time-band reception symbols, for example, by squaring an absolute value of a correlation value between the reception symbols. The noncoherent demodulator 203 outputs the demodulated symbols to the M-ary channel decoder 205.

The M-ary channel decoder 205 determines which codeword was transmitted from the transmitter by analyzing the soft decision value received from the noncoherent demodulator 203, and outputs data bits corresponding thereto. Herein, the M-ary channel decoder 205 can be implemented with a binary channel decoder or an M-ary channel decoder according to input bits.

The output information corresponds to the fast feedback information transmitted by the MS transmitter, if it was normally received without an error in its transmission process or demodulation and decoding process. Therefore, the fast feedback information is used for a scheduling process and an information transmission process at a next time by a controller (not shown) or a scheduler (also not shown) included in the BS.

A description will now be made of a method for transmitting/receiving uplink fast feedback information in the MS transmitter and the BS receiver.

Figure 3:
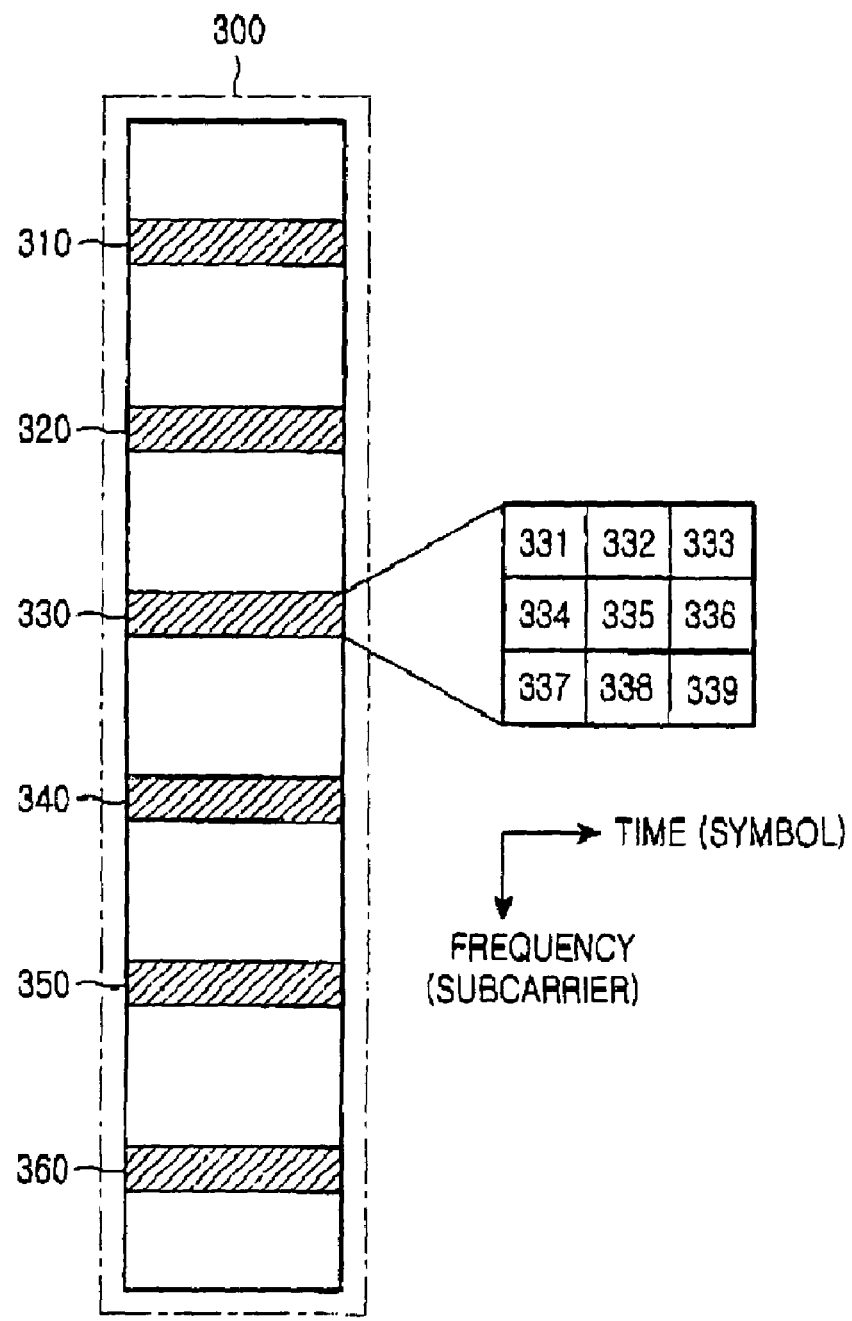
FIG. 3 is a diagram illustrating time-frequency resources allocated for transmission of uplink fast feedback information in an OFDMA communication system according to an embodiment of the present invention.

FIG. 3 is a diagram illustrating time-frequency resources in which six 3×3 subcarrier bundles are allocated for transmission of uplink fast feedback information in an OFDMA communication system according to the present invention.

As illustrated in FIG. 3, an embodiment of the present invention will be described with reference to a method for transmitting fast feedback information by allocating six 3×3 subcarrier bundles to subchannels on a time-frequency domain on an uplink in an OFDM communication system. However, the present invention is not limited to this embodiment, and the uplink subchannels should not necessarily include the six 3×3 subcarrier bundles. For example, the uplink subchannels may include six 4×3 subcarrier bundles.

Referring to FIG. 3, reference numeral 300 represents a set of subchannels in a particular time domain. Therefore, the subchannel set 300 includes a plurality of subchannels therein. Each of the subchannels includes one or more subcarriers. In FIG. 3, hatched parts 310, 320, 330, 340, 350 and 360 represent uplink subcarrier bundles (or tiles), and one uplink subchannel includes six subcarrier bundles. That is, reference numerals 310, 320, 330, 340, 350 and 360 represent a fast feedback channel.

One uplink subchannel includes six 3×3 subcarrier bundles in a time-frequency domain, each of which is configured as shown by reference numeral 330. In the shown subcarrier bundle, a horizontal axis represents a time or a symbol, and a vertical axis represents a frequency or a subcarrier.

Information data bits, for example, fast feedback information, are transmitted through one uplink subchannel, i.e., fast feedback channel, as shown in FIG. 3. The information data bits, as described with reference to FIG. 1, pass through an M-ary channel encoder 101. It will be assumed herein that the number of the information data bits is 6 and an M (=8)-ary channel encoder is used. Therefore, the subchannel 330, as can be understood from its internal structure, carries information output from the 8-ary channel encoder in its 8 boundary zones shown by reference numerals 331, 332, 333, 334, 336, 337, 338 and 339, and carries a pilot symbol in the center zone shown by reference numeral 335.

Table 1 below shows 64 possible codewords output from the 8-ary channel encoder.

TABLE 1

| | Codeword | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| A0 | 0 | 1 | 2 | 3 | 4 | 5 | 6 | 7 | 2 | 3 | 0 | 1 | 6 | 7 | 4 | 5 |
| A1 | 0 | 1 | 2 | 3 | 4 | 5 | 6 | 7 | 4 | 5 | 6 | 7 | 0 | 1 | 2 | 3 |
| A2 | 0 | 1 | 2 | 3 | 4 | 5 | 6 | 7 | 3 | 2 | 1 | 0 | 7 | 6 | 5 | 4 |
| A3 | 0 | 1 | 2 | 3 | 4 | 5 | 6 | 7 | 6 | 7 | 4 | 5 | 2 | 3 | 0 | 1 |
| A4 | 0 | 1 | 2 | 3 | 4 | 5 | 6 | 7 | 7 | 6 | 5 | 4 | 3 | 2 | 1 | 0 |
| A5 | 0 | 1 | 2 | 3 | 4 | 5 | 6 | 7 | 5 | 4 | 7 | 6 | 1 | 0 | 3 | 2 |
| | Codeword | | | | | | | | | | | | | | | |
| | 16 | 17 | 18 | 19 | 20 | 21 | 22 | 23 | 24 | 25 | 26 | 27 | 28 | 29 | 30 | 31 |
| A0 | 4 | 5 | 6 | 7 | 0 | 1 | 2 | 3 | 3 | 2 | 1 | 0 | 7 | 6 | 5 | 4 |
| A1 | 3 | 2 | 1 | 0 | 7 | 6 | 5 | 4 | 6 | 7 | 4 | 5 | 2 | 3 | 0 | 1 |
| A2 | 6 | 7 | 4 | 5 | 2 | 3 | 0 | 1 | 7 | 6 | 5 | 4 | 3 | 2 | 1 | 0 |
| A3 | 7 | 6 | 5 | 4 | 3 | 2 | 1 | 0 | 5 | 4 | 7 | 6 | 1 | 0 | 3 | 2 |

TABLE 1-continued

| | | | | | | | | | | | | | | | | |
|---|---|---|---|---|---|---|---|---|---|---|---|---|---|---|---|---|
| A4 | 5 | 4 | 7 | 6 | 1 | 0 | 3 | 2 | 1 | 0 | 3 | 2 | 5 | 4 | 7 | 6 |
| A5 | 1 | 0 | 3 | 2 | 5 | 4 | 7 | 6 | 2 | 3 | 0 | 1 | 6 | 7 | 4 | 5 |

| Codeword | | | | | | | | | | | | | | | | |
|---|---|---|---|---|---|---|---|---|---|---|---|---|---|---|---|---|
| | 32 | 33 | 34 | 35 | 36 | 37 | 38 | 39 | 40 | 41 | 42 | 43 | 44 | 45 | 46 | 47 |
| A0 | 6 | 7 | 4 | 5 | 2 | 3 | 0 | 1 | 7 | 6 | 5 | 4 | 3 | 2 | 1 | 0 |
| A1 | 7 | 6 | 5 | 4 | 3 | 2 | 1 | 0 | 5 | 4 | 7 | 6 | 1 | 0 | 3 | 2 |
| A2 | 5 | 4 | 7 | 6 | 1 | 0 | 3 | 2 | 1 | 0 | 3 | 2 | 5 | 4 | 7 | 6 |
| A3 | 1 | 0 | 3 | 2 | 5 | 4 | 7 | 6 | 2 | 3 | 0 | 1 | 6 | 7 | 4 | 5 |
| A4 | 2 | 3 | 0 | 1 | 6 | 7 | 4 | 3 | 4 | 5 | 6 | 7 | 0 | 1 | 2 | 3 |
| A5 | 4 | 5 | 6 | 7 | 0 | 1 | 2 | 3 | 3 | 2 | 1 | 0 | 7 | 6 | 5 | 4 |

| Codeword | | | | | | | | | | | | | | | | |
|---|---|---|---|---|---|---|---|---|---|---|---|---|---|---|---|---|
| | 48 | 49 | 50 | 51 | 52 | 53 | 54 | 55 | 56 | 57 | 58 | 59 | 60 | 61 | 62 | 63 |
| A0 | 5 | 4 | 7 | 6 | 1 | 0 | 3 | 2 | 1 | 0 | 3 | 2 | 5 | 4 | 7 | 6 |
| A1 | 1 | 0 | 3 | 2 | 5 | 4 | 7 | 6 | 2 | 3 | 0 | 1 | 6 | 7 | 4 | 5 |
| A2 | 2 | 3 | 0 | 1 | 6 | 7 | 4 | 5 | 4 | 5 | 6 | 7 | 0 | 1 | 2 | 3 |
| A3 | 4 | 5 | 6 | 7 | 0 | 1 | 2 | 3 | 3 | 2 | 1 | 0 | 7 | 6 | 5 | 4 |
| A4 | 3 | 2 | 1 | 0 | 7 | 6 | 5 | 4 | 6 | 7 | 4 | 5 | 2 | 3 | 0 | 1 |
| A5 | 6 | 7 | 4 | 5 | 2 | 3 | 0 | 1 | 7 | 6 | 5 | 4 | 3 | 2 | 1 | 0 |

Upon receiving information data bits, the 8-ary channel encoder in a transmitter outputs one of the possible 64 codewords shown in Table 1 to a noncoherent modulator. Herein, the 8-ary channel encoder is set such that the minimum Hamming distance between codewords becomes maximized for the given number and length of codewords. The term "Hamming distance" refers to the number of inconsistent bits between binary codes having the same number of bits.

The minimum Hamming distance, a factor that mainly affects a codeword error rate in this transmission method, becomes 5. For example, for a codeword "32" among the 64 possible codewords, a pattern of codeword indexes A0, A1, A2, A3, A4 and A5 for its subcarrier bundles becomes "675124," and for a codeword "40," a pattern of codeword indexes A0, A1, A2, A3, A4 and A5 for its subcarrier bundles becomes "751243," so the minimum Hamming distance between the two codewords "32" and "40" becomes 5. The minimum Hamming distance being 5 indicates that a Hamming distance between two of all the possible codewords is greater than or equal to 5.

The foregoing transmission method can also be replaced with a method of transmitting 5 bits using 32 codewords.

Thereafter, in order to transmit the allocated codeword through a fast feedback channel, the noncoherent modulator performs orthogonal modulation on the codeword received from the 8-ary channel encoder. That is, the noncoherent modulator modulates the information data bits encoded by the 8-ary channel encoder using the orthogonal modulation scheme. Orthogonal vectors used for the orthogonal modulation are shown in Table 2 below.

TABLE 2

| Vector Index | Subcarrier Modulation per Codeword Subcarrier 0, Subcarrier 1, . . . , Subcarrier 7 |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

As shown in Table 2, the orthogonal vectors to be used for the orthogonal modulation can be represented by P0, P1, P2 and P3, and when the orthogonal vectors are modulated into Quadrature Phase Shift Keying (QPSK) modulation symbols, the modulation symbols generated by a QPSK modulation scheme can be defined as Equation (1):

$$P0 = \exp\left(j\frac{\pi}{4}\right)$$
$$P1 = \exp\left(j\frac{3\pi}{4}\right)$$
$$P2 = \exp\left(-j\frac{3\pi}{4}\right)$$
$$P3 = \exp\left(-j\frac{\pi}{4}\right)$$
(1)

Herein, the 8 boundary subcarriers of a 3×3 subcarrier bundle transmit data symbols shown in Table 2, and the center subcarrier transmits a pilot symbol. That is, in FIG. 3, the subcarriers indicated by reference numerals 331, 332, 333, 334, 336, 337, 338 and 339 transmit symbols shown in Table 2, and the center subcarrier indicated by reference numeral 335 transmits a pilot symbol. Herein, the pilot symbol can be randomly established.

For example, if 6 information data bits to be transmitted are given, the transmitter determines a codeword depending on Table 1. Thereafter, according to the determined codeword, the transmitter transmits orthogonal vectors of a pattern, i.e., a vector index, corresponding to a codeword index A0 through a first 3×3 subcarrier bundle, transmits orthogonal vectors of a pattern, i.e., a vector index, corresponding to a codeword index A1 through a second 3×3 subcarrier bundle, and in the same manner, finally transmits orthogonal vectors of a pattern, i.e., a vector index corresponding to a codeword index A5 through a sixth 3×3 subcarrier bundle, using the method shown in Table 2. More specifically, if a vector index for the first 3×3 subcarrier bundle is 4, its data symbol values are set as P0, P0, P0, P0, P0, P0, P0, P0 corresponding to the vector index 4. If a vector index for the second 3×3 subcarrier bundle is 7, its data symbol values are set as P0, P2, P2, P0, P2, P0, P0, P2 corresponding to the vector index 7. If a vector index for the third 3×3 subcarrier bundle is 2, its data symbol values are set as P0, P0, P1, P1, P2, P2, P3, P3 corresponding to the vector index 2.

A description will now be made of a reception method.

Upon receiving the transmission signal from the transmitter, an FFT unit in a receiver performs an FFT process on the received signal, and outputs the FFT-processed signal to a noncoherent demodulator. The noncoherent demodulator calculates a square for an absolute value of a correlation value between 8 possible orthogonal vectors for each of six 3×3 subcarrier bundles, and outputs the calculation result to an M-ary channel decoder. The M-ary channel decoder calculates a sum of squares for absolute values of correlation values between orthogonal vectors, for each of all 64 possible codewords. Thereafter, the receiver determines that the transmitter transmitted the information data bits corresponding to a codeword having the maximum value among the calculated values.

An embodiment of the present invention has been described with reference to an exemplary transmission method of transmitting 6 information data bits. A description will now be made of an exemplary transmission method of transmitting 3 information data bits according to the present invention.

Figure 4:
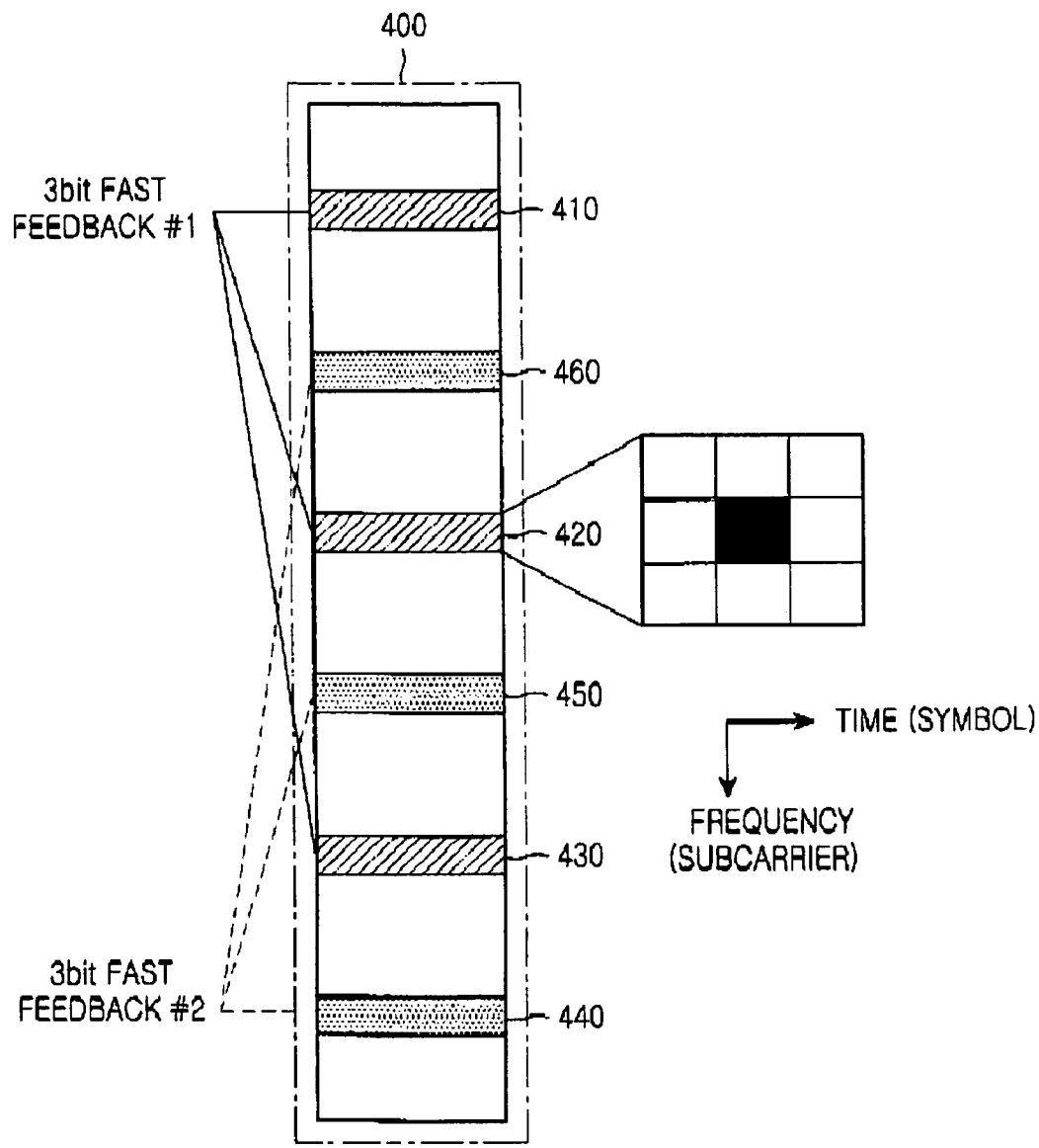
FIG. 4 is a diagram illustrating time-frequency resources allocated for transmission of uplink fast feedback information in an OFDMA communication system according to another embodiment of the present invention.

FIG. 4 is a diagram illustrating time-frequency resources in which six 3×3 subcarrier bundles are allocated for transmission of uplink fast feedback information in an OFDMA communication system according to the present invention.

Fast feedback information transmission shown in FIG. 4 is equal to the fast feedback information transmission shown in FIG. 3 in that one uplink subchannel is comprised of six 3×3 subcarrier bundles. The 3-bit fast feedback information transmission method proposed in FIG. 4 will be described with reference to an exemplary transmission method in which six 3×3 subcarrier bundles are allocated to 3 subchannels in a time-frequency domain on an uplink in an OFDMA communication system. However, the present invention is not limited to this embodiment, and the uplink subchannels should not necessarily include the six 3×3 subcarrier bundles. For example, the uplink subchannels may include six 4×3 subcarrier bundles.

Referring to FIG. 4, reference numeral 400 represents a set of subchannels in a particular time domain. Therefore, the subchannel set 400 includes a plurality of subchannels therein. Each of the subchannels includes one or more subcarriers. In FIG. 4, hatched parts 410, 420, 430, 440, 450 and 460 represent uplink subcarrier bundles (or tiles), and one uplink subchannel includes six subcarrier bundles. That is, reference numerals 410, 420, 430, 440, 450 and 460 represent a fast feedback channel.

One uplink subchannel includes six 3×3 subcarrier bundles in a time-frequency domain, each of which is configured as shown by reference numeral 420. In the shown subcarrier bundle, a horizontal axis represents a time or a symbol, and a vertical axis represents a frequency or a subcarrier.

In FIG. 4, information data bits, for example, fast feedback information, are transmitted through three uplink subchannels, i.e., fast feedback channels. In FIG. 4, among the subchannels 410, 420, 430, 440, 450 and 460, even subchannels 410, 420 and 430 constitute one fast feedback channel, and odd subchannels 440, 450 and 460 constitute another fast feedback channel. Therefore, an embodiment of the present invention as shown in FIG. 4 can generate two fast feedback subchannels.

The present invention has been described with reference to an exemplary method of generating two fast feedback subchannels using three subchannels. However, the present invention is not so limited, and it would be obvious to those skilled in the art that the present invention can also be applied to another exemplary method of generating, for example, three fast feedback subchannels using two subchannels.

The 3-bit fast feedback information transmitted using one of the fast feedback channels can transmit low-quantity information such as an antenna group index, an antenna selection index and a precoding index for a multi-antenna transmission technology, for example, Multi-Input Multi-Output (MIMO) technology.

The information data bits pass through an M-ary channel encoder 101 shown in FIG. 1. It will be assumed herein that the number of the information data bits is 3 and an M (=8)-ary channel encoder is used. Therefore, the subchannel 420, as can be understood from its internal structure, carries information output from the 8-ary channel encoder in its 8 boundary zones, and carries a pilot symbol in the center zone.

Table 3 below shows 8 possible codewords output from the 8-ary channel encoder for 3 input information data bits.

TABLE 3

| 3 bit payload | Fast Feedback Vector Index per Tile<br>Even = {tile (0), tile (2), tile (4)},<br>Odd = {tile (1), tile (3), tile (5)} |
|---|---|
| 0b000 | 0, 0, 0 |
| 0b001 | 1, 1, 1 |
| 0b010 | 2, 2, 2 |
| 0b011 | 3, 3, 3 |
| 0b100 | 4, 4, 4 |
| 0b101 | 5, 5, 5 |
| 0b110 | 6, 6, 6 |
| 0b111 | 7, 7, 7 |

It is possible to generate two 3-bit fast feedback channels with one uplink subchannel by dividing 3×3 subcarrier bundles (tiles) into three odd subcarrier bundles and three even subcarrier bundles as shown in Table 3.

Referring to Table 3, upon receiving the information data bits, the 8-ary channel encoder in a transmitter outputs a selected one of the 8 possible codewords, shown in Table 3, to a noncoherent modulator. Herein, the 8-ary channel encoder is set such that the minimum Hamming distance between codewords becomes maximized for the given number and length of codewords. The term "Hamming distance" refers to the number of inconsistent bits between binary codes having the same number of bits.

The minimum Hamming distance, a factor that mainly affects a codeword error rate in this transmission method, is maximized to 6. The vector index for each of the codewords generated in this manner is mapped to its associated subcarriers in a conventional method shown in FIG. 5, and transmitted in the method described with reference to FIG. 1.

Figure 5:
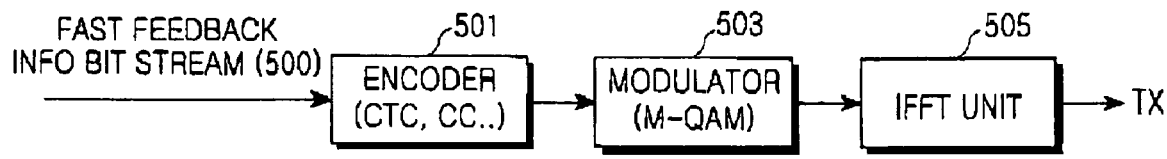
FIG. 5 is a block diagram schematically illustrating a structure for transmitting fast feedback information using a Downlink Interval Usage Code (DIUC) scheme according to an embodiment of the present invention.

FIG. 5 is a block diagram schematically illustrating a structure for transmitting fast feedback information using a Downlink Interval Usage Code (DIUC) scheme according to the present invention.

The transmission method of FIG. 1 is designed such that it can guarantee stable reception quality for feedback information even in a bad wireless channel environment, making it possible to transmit a maximum of 6 information bits in one uplink subchannel. However, the 6 information bits are insufficient to efficiently increase cell capacity in a multi-antenna transmission system, because the system requires as much wireless channel information as possible. For this structure, there is a possible method for allocating several fast feedback channels to provide as much information as possible. However, this method uses excessive uplink resources.

In order to solve this problem, the present invention allows an MS having a good wireless channel environment to transmit many feedback information bits by applying the conventional data transmission scheme shown in FIG. 5. Although allocation of the fast feedback channels is achieved in the conventional method, it is preferable to use a coding scheme predefined between the system and the MS, for example, QPSK and 16-ary Quadrature Amplitude Modulation (16 QAM), for a transmission method. The MS, when it supports MIMO transmission, can use space-time coding such as space-time block coding (STBC) in order to guarantee stable transmission in the DFUC scheme.

With reference to FIG. 5, a description will now be made of a process of transmitting a fast feedback information bit stream 500.

Referring to FIG. 5, the transmitter includes an encoder 501 for encoding an information data bit stream 500 for uplink fast feedback information, a modulator 503 for modulating the information data bits using a predetermined coding scheme, and an IFFT unit 505 for IFFT-processing a transmission signal before transmission.

The fast feedback information bit stream 500 uses a 3-bit fast feedback scheme proposed in an embodiment of the present invention, and such a DIUC scheme and the 6-bit fast feedback scheme described above can indicate an MS by transmitting a field shown in Table 4 through downlink control information.

TABLE 4

| Indication Field | Length (bits) | Contents |
| --- | --- | --- |
| CQICH type | 2 | 00 = 6 bit CQI, |
| | | 01 = DIUC-CQI |
| | | 10 = 3 bit CQI (even) |
| | | 11 = 3 bit CQI (odd) |

As shown in Table 4, in an indication field, CQICH type='00' indicates a 6-bit fast feedback scheme, CQICH type='01' indicates a DIUC scheme for transmitting much more information to an MS having a good wireless channel environment, CQICH type='10' indicates even subcarrier bundles for an uplink subchannel allocated in a 3-bit fast feedback scheme, and CQICH type='11' indicates odd subcarrier bundles for the uplink subchannel allocated in the 3-bit fast feedback scheme. In addition, it is also possible to increase the number of fast feedback channels by increasing a length of a CQICH type value of the indication field and decreasing the number of information bits transmitted over the fast feedback channels. The fast feedback information bit stream 500 is input to the encoder 501 as shown in FIG. 5. The fast feedback information bit stream 500 is an information bit stream output from a controller not shown in FIG. 5.

If there is a fast feedback information bit stream 500 to transmit, the encoder 501 encodes the fast feedback information bit stream 500 according to a coding scheme predefined in a system setup process, and outputs the coding result to the modulator 503. Herein, the encoder 501 can use various coding schemes such as Convolution Turbo Code (CTC), Convolutional Code (CC) and Space Time Block Code (STBC), as the coding scheme predefined in the system setup process.

The modulator 503 modulates the coded symbols output from the encoder 501 into modulation symbols using a modulation scheme predefined in the system setup process, and outputs the modulation symbols to the IFFT unit 505. Herein, the modulator 503 can use, for example, M-order QAM modulation as the predefined modulation scheme.

The IFFT unit 505 IFFT-processes the modulation symbols received from the modulator 503, generating OFDM symbols to transmit. Generally, the OFDM symbol includes a CP. However, a structure thereof and a structure for transmission in a wireless band are omitted in FIG. 5, for simplicity.

As can be understood from the foregoing description, the present invention can generate fast feedback information in various formats to efficiently transmit channels in a BWA communication system, making it possible to obtain correct and various feedback information. In addition, in transmitting uplink fast feedback information using given time-frequency resources, the BWA communication system maps various types of fast feedback information of 3 bits, 5 bits or 6 bits to transmission information data bits, thereby contributing to correct information delivery and stable system operation.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for transmitting uplink fast feedback information in a wireless communication system, the apparatus comprising:

a channel encoder for inputting uplink fast feedback information to transmit, and outputting 3-bit codewords being set according to the fast feedback information;

a noncoherent modulator for modulating transmission symbols corresponding to the codewords using a noncoherent modulation scheme; and an inverse fast Fourier transform (IFFT) unit for generating a transmission signal comprised of subcarrier bundles by IFFT-processing the modulated transmission symbols before transmission, wherein the 3-bit codewords are represented as 3-bit payloads as follows:

| 3 bit payload | Fast Feedback Vector Index per Tile Even = {tile (0), tile (2), tile (4)}, Odd = {tile (1), tile (3), tile (5)} |
| --- | --- |
| 0b000 | 0, 0, 0 |
| 0b001 | 1, 1, 1 |
| 0b010 | 2, 2, 2 |
| 0b011 | 3, 3, 3 |
| 0b100 | 4, 4, 4 |
| 0b101 | 5, 5, 5 |
| 0b110 | 6, 6, 6 |
| 0b111 | 7, 7, 7 | wherein the fast feedback vector index is represented as a vector index as follows:

| VECTOR INDEX | Subcarrier modulation per codeword subcarrier 0, subcarrier 1, . . . , subcarrier 7 |
| --- | --- |
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 | and wherein orthogonal vectors P0, P1, P2 and P3, each of which indicates a Quadrature Phase Shift Keying (QPSK) modulation symbol, can be expressed by:

$$P0 = \exp\left(j \cdot \frac{\pi}{4}\right)$$
$$P1 = \exp\left(j \cdot \frac{3\pi}{4}\right)$$
$$P2 = \exp\left(-j \cdot \frac{3\pi}{4}\right)$$
$$P3 = \exp\left(-j \cdot \frac{\pi}{4}\right).$$

2. The apparatus of claim 1, wherein the channel encoder inputs the uplink fast feedback information, and outputs 8 codewords.

3. The apparatus of claim 1, wherein the transmission signal is transmitted through a fast feedback channel, including at least one subchannel group, each including a predetermined number of subchannels.

4. The apparatus of claim 1, wherein the codewords are set in an order where a minimum Hamming distance between the codewords defined in a system setup process becomes maximized.

5. An apparatus for receiving uplink fast feedback information in a wireless communication system, the apparatus comprising:
  a reception device for receiving a signal transmitted from a transmission apparatus through an uplink fast feedback channel, extracting 3-bit codewords from the received signal, and using fast feedback information acquired by decoding the extracted codewords in transmitting information at a next time,
  wherein the 3-bit codewords are represented as 3-bit payload as follows:

| 3 bit payload | Fast Feedback Vector Index per Tile Even = {tile (0), tile (2), tile (4)}, Odd = {tile (1), tile (3), tile (5)} |
| --- | --- |
| 0b000 | 0, 0, 0 |
| 0b001 | 1, 1, 1 |
| 0b010 | 2, 2, 2 |
| 0b011 | 3, 3, 3 |
| 0b100 | 4, 4, 4 |
| 0b101 | 5, 5, 5 |
| 0b110 | 6, 6, 6 |
| 0b111 | 7, 7, 7 | wherein the fast feedback vector index is represented as a vector index as follows:

| VECTOR INDEX | Subcarrier modulation per codeword subcarrier 0, subcarrier 1, . . . , subcarrier 7 |
| --- | --- |
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 | and wherein orthogonal vectors P0, P1, P2 and P3, each of which indicates a Quadrature Phase Shift Keying (QPSK) modulation symbol, can be expressed by:

$$P0 = \exp\left(j \cdot \frac{\pi}{4}\right)$$
$$P1 = \exp\left(j \cdot \frac{3\pi}{4}\right)$$
$$P2 = \exp\left(-j \cdot \frac{3\pi}{4}\right)$$
$$P3 = \exp\left(-j \cdot \frac{\pi}{4}\right).$$

6. A method for transmitting uplink fast feedback information in a wireless communication system, the method comprising the steps of:
  inputting uplink fast feedback information to transmit, and outputting 3-bit codewords being set according to the fast feedback information;
  modulating transmission symbols corresponding to the codewords using a noncoherent modulation scheme; and
  generating a transmission signal comprised of subcarrier bundles by performing an inverse fast Fourier transform (IFFT) process on the modulated transmission symbols,
  wherein the 3-bit codewords are represented as 3-bit payloads as follows:

| 3-bit payload | Fast Feedback Vector Index per Tile Even = {tile (0), tile (2), tile (4)}, Odd = {tile (1), tile (3), tile (5)} |
| --- | --- |
| 0b000 | 0, 0, 0 |
| 0b001 | 1, 1, 1 |
| 0b010 | 2, 2, 2 |
| 0b011 | 3, 3, 3 |
| 0b100 | 4, 4, 4 |
| 0b101 | 5, 5, 5 |
| 0b110 | 6, 6, 6 |
| 0b111 | 7, 7, 7 | wherein the fast feedback vector index is represented as a vector index as follows:

| VECTOR INDEX | Subcarrier modulation per codeword subcarrier 0, subcarrier 1, . . . , subcarrier 7 |
| --- | --- |
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 | and wherein orthogonal vectors P0, P1, P2 and P3, each of which indicates a Quadrature Phase Shift Keying (QPSK) modulation symbol, can be expressed by:

$$P0 = \exp\left(j \cdot \frac{\pi}{4}\right)$$
$$P1 = \exp\left(j \cdot \frac{3\pi}{4}\right)$$

-continued $$P2 = \exp\left(-j \cdot \frac{3\pi}{4}\right)$$

$$P3 = \exp\left(-j \cdot \frac{\pi}{4}\right).$$

7. The method of claim 6, further comprising inputting the uplink fast feedback information, and outputting 8 codewords.

8. The method of claim 6, wherein the transmission signal is transmitted through a fast feedback channel, including at least one subchannel group, each including a predetermined number of subchannels.

9. The method of claim 6, wherein the codewords are set in an order where a minimum Hamming distance between the codewords defined in a system setup process becomes maximized.

10. A method for receiving uplink fast feedback information in a wireless communication system, the method comprising the steps of:
receiving a signal transmitted from a transmission apparatus through an uplink fast feedback channel;
extracting 3-bit codewords from the received signal; and
controlling information transmission at a next time using fast feedback information acquired by decoding the extracted codewords,
wherein the 3-bit codewords are represented as 3-bit payloads as follows:

| 3-bit payload | Fast Feedback Vector Index per Tile Even = {tile (0), tile (2), tile (4)}, Odd = {tile (1), tile (3), tile (5)} |
|---|---|
| 0b000 | 0, 0, 0 |
| 0b001 | 1, 1, 1 |
| 0b010 | 2, 2, 2 |
| 0b011 | 3, 3, 3 |
| 0b100 | 4, 4, 4 |
| 0b101 | 5, 5, 5 |
| 0b110 | 6, 6, 6 |
| 0b111 | 7, 7, 7 | wherein the fast feedback vector index is represented as a vector index as follows:

| VECTOR INDEX | Subcarrier modulation per codeword subcarrier 0, subcarrier 1, . . . , subcarrier 7 |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 | and wherein orthogonal vectors P0, P1, P2 and P3, each of which indicates a Quadrature Phase Shift Keying (QPSK) modulation symbol, can be expressed by:

$$P0 = \exp\left(j \cdot \frac{\pi}{4}\right)$$

$$P1 = \exp\left(j \cdot \frac{3\pi}{4}\right)$$

$$P2 = \exp\left(-j \cdot \frac{3\pi}{4}\right)$$

$$P3 = \exp\left(-j \cdot \frac{\pi}{4}\right).$$

11. The apparatus of claim 1, wherein the apparatus receives an indication field, which indicates a fast feedback information transmission scheme, defined as follows:

| Indication Field | Length (bits) | Contents |
|---|---|---|
| CQICH type | 2 | 00 = 6 bit CQI, 01 = DIUC-CQI 10 = 3 bit CQI (even) 11 = 3 bit CQI (odd). |

12. The method of claim 6, further comprising receiving an indication field, which indicates a fast feedback information transmission scheme, defined as follows:

| Indication Field | Length (bits) | Contents |
|---|---|---|
| CQICH type | 2 | 00 = 6 bit CQI, 01 = DIUC-CQI 10 = 3 bit CQI (even) 11 = 3 bit CQI (odd). |

* * * * *

UNITED STATES PATENT AND TRADEMARK OFFICE
CERTIFICATE OF CORRECTION

PATENT NO. : 7,590,045 B2  Page 1 of 1
APPLICATION NO. : 11/329615
DATED : September 15, 2009
INVENTOR(S) : Oh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 858 days.

Signed and Sealed this

Twenty-first Day of September, 2010

David J. Kappos
*Director of the United States Patent and Trademark Office*